(12) United States Patent
Bradley (10) Patent No.: US 10,286,852 B1
(45) Date of Patent: May 14, 2019

(54) CAPTIVE WEAPON RACK (71) Applicant: Keith Aaron Bradley, La Farge, WI (US)

(72) Inventor: Keith Aaron Bradley, La Farge, WI (US)

(*) Notice: Subject to any disclaimer, the term of this patent is extended or adjusted under 35 U.S.C. 154(b) by 352 days.

(21) Appl. No.: 15/136,945

(22) Filed: Apr. 24, 2016

(51) Int. Cl.
*B60R 7/00* (2006.01)
*B60R 7/14* (2006.01)

(52) U.S. Cl.
CPC ................................ *B60R 7/14* (2013.01)

(58) Field of Classification Search
CPC ............................................... B60R 7/14
USPC .................................................. 224/401, 567
See application file for complete search history.

(56) References Cited

U.S. PATENT DOCUMENTS

| | | | | |
|---|---|---|---|---|
| 5,595,333 A * | 1/1997 | Boston | ..................... | B60R 7/14 211/60.1 |
| 6,199,734 B1 * | 3/2001 | Meeks | ..................... | B60R 9/08 224/401 |
| 6,913,286 B2 * | 7/2005 | Kramer | ..................... | B60R 7/14 211/64 |
| 7,559,444 B1 * | 7/2009 | Church | ..................... | B60R 7/14 224/401 |
| 10,018,444 B1 * | 7/2018 | Nielson | ................. | F41B 5/1453 |
| 10,035,468 B2 * | 7/2018 | Mifsud | ................... | B60R 9/058 |
| 2009/0090758 A1 * | 4/2009 | Bartholdy | ................ | B60R 7/14 224/571 |
| 2011/0198375 A1 * | 8/2011 | Bennett | .................... | B60R 7/14 224/401 |
| 2012/0000949 A1 * | 1/2012 | Williams, Jr. | ........... | B60R 7/14 224/401 |
| 2014/0097222 A1 * | 4/2014 | Robinson | ................. | B60R 7/14 224/401 |

* cited by examiner

*Primary Examiner* — Peter N Helvey
(74) *Attorney, Agent, or Firm* — Charles S. Sara; DeWitt LLP (57) ABSTRACT

The invention is a captive weapon rack object that is intended to secure any shoulder fired weapon from moving or being moved. The object captures each end of the weapon and constricts itself assuring that the weapon is secured. The captive weapon rack constricts the ends of the weapon with tension that is created by a retracting mechanism. At least one of the captivating ends is oblong to prevent the weapon from rotating while in the captive weapon rack. A locking device prevents the captive weapon rack from extending.

14 Claims, 11 Drawing Sheets

CAPTIVE WEAPON RACK

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates to a shoulder fired weapon rack that can be mounted to a structure that captures each end preventing it from moving during transport. It comprises a tensioning system to allow different lengths of weapons to be used in it without the need for manual adjustments.

BACKGROUND OF THE INVENTION

Weapon racks are necessary for safely transporting shoulder fired weapons with versatility and ease of use being important. Quick use is critical in the acts of hunting, self-defense, law enforcement or military allowing the user to quickly remove or replace the weapon from the weapon rack. Versatility and ease of use is a feature that is critical when a multitude of weapons need to be used at different times and adjustments to the rack for such an instance produce a time consuming burden on the user. The captive weapon rack eliminates the potential need for adjustments and allows the operator to quickly remove or replace the weapon in the rack. The captive weapon rack can also include a locking mechanism that would deter theft when unattended such as when mounted on a utility vehicle that cannot be locked itself. When a typical weapon rack is mounted horizontally, the weapon is pointed at anybody that is nearby. For instance, a police cruiser that is in motion or stationary with people walking by, the muzzle is pointed at them. Said invention can include a device that will contain potential misfired bullets or loads if the weapon were to accidentally misfire.

BRIEF SUMMARY OF THE INVENTION

The captive weapon rack is a device that allows for multiple types and models of shoulder fired weapons to be used in the same rack without the need for adjustments including cross bows and long guns. The captive weapon rack comprises two end cups that encapsulate a shoulder fired weapon preventing it from moving or being removed. The captive weapon rack comprises a retracting mechanism that pulls the two end cups tight onto the weapon. Said end cups encapsulate the butt and muzzle extending past each to prevent said weapon from moving or being removed with the end cups extending past the point of contact with the weapon tapering at the contact point to accommodate different sizes. Said end cups are made from a smooth material that will not mar or scratch the surfaces of the weapon placed in them. Said end cups can be easily removed and replaced for weapons that have a unique muzzle or butt stock design such as double barreled shotgun or a crossbow. Said device further comprises a locking mechanism that prevents the mechanism from extending unless it is depressed and can also have a keyed lock incorporated that would prevent theft of the weapon. The device comprises one end cup that is oblong and captures the butt of the shoulder fired weapon preventing the weapon from rotating when in the rack. The captive weapon rack comprises adjustable mounts that can be moved along its structure to allow flexible horizontal or near horizontal mounting positions. It also can incorporate a single or plurality of mounting brackets that allow it to be mounted in a vertical or near vertical position. Said device can also incorporate an end cap that covers the muzzle of a shoulder fired weapon and dissipates the energy of the weapon's projectile and catches said projectile.

BRIEF DESCRIPTION OF THE DRAWINGS

The drawings in this application illustrate the interaction of the components.

DETAILED DESCRIPTION OF THE INVENTION (PREFERRED EMBODIMENT)

Figure 7:
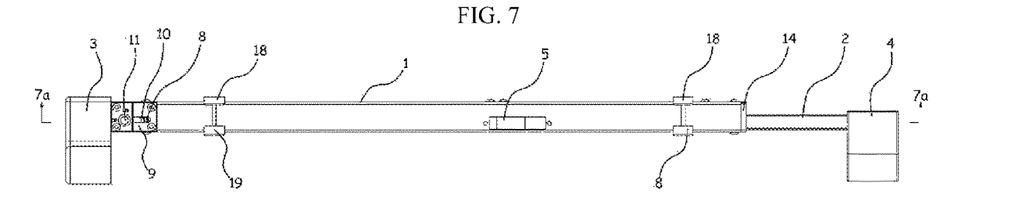
FIG. 7 shows a top view of the captive weapon rack in the preferred embodiment comprising a locking mechanism, keyed lock and movable end cups.

FIG. 7 shows a top view of the captive weapon rack comprising a main tube (1), inner tube (2), stock cup (3), muzzle cup (4), mechanism housing (5), latch (8), latch plate (9), ball detent (10), keyed lock (11), end cap (14), bottom clamp (18) and upper clamp (19).

Figure 7A:
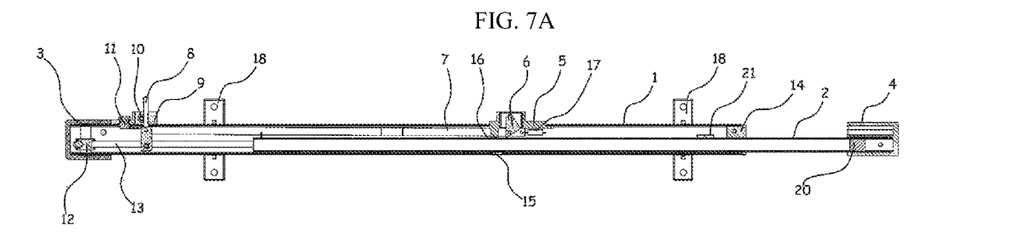
FIG. 7A shows a cross sectional view of the captive weapon rack in the preferred embodiment comprising a locking mechanism, keyed lock and movable end cups.

FIG. 7A shows a sectional view from the front of the captive weapon rack comprising a main tube (1), inner tube (2), stock cup (3), muzzle cup (4), mechanism housing (5), catch spur (6), mechanism shaft (7), latch (8), latch plate (9), ball detent (10), keyed lock (11), return pulley (12), return cord (13), end cap (14), disk gib (15), wide gib (16), open ended extension spring (17), bottom clamp (18), upper clamp (19), inner cord clamp (20) and main cord clamp (21).

Figure 8:
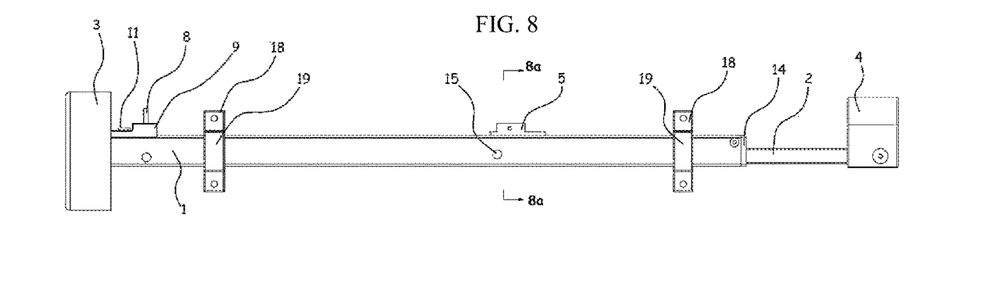
FIG. 8 shows a front view of the captive weapon rack in the preferred embodiment comprising a locking mechanism, keyed lock and movable end cups.

FIG. 8 shows a front view of the captive weapon rack comprising a main tube (1), inner tube (2), stock cup (3), muzzle cup (4), mechanism housing (5), latch (8), latch plate (9), keyed lock (11), end cap (14), bottom clamp (18) and upper clamp (19).

Figure 8A:
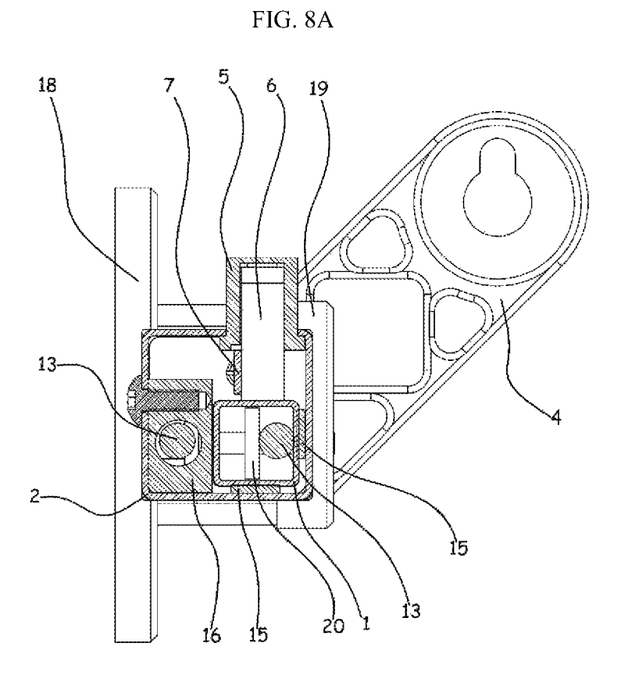
FIG. 8A shows a cross sectional end view of the captive weapon rack in the preferred embodiment comprising a locking mechanism, keyed lock and movable end cups.

FIG. 8A shows a sectional view from the end comprising a main tube (1), inner tube (2), stock cup (3), muzzle cup (4), mechanism housing (5), catch spur (6), mechanism shaft (7), return cord (13), disk gib (15), wide gib (16), bottom clamp (18), upper clamp (19) and inner cord clamp (20).

Figure 13:
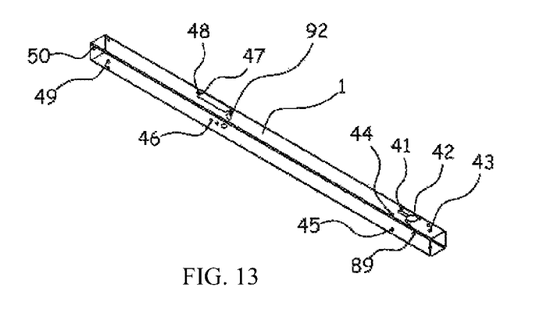
FIG. 13 shows an isometric view with hidden lines of the main tube from the preferred embodiments.

FIG. 13 shows the main tube (1) that is made of a rigid hollow material such as steel or extruded aluminum. It has a mechanism hole (47) cut in the top of it to allow clearance for mechanism housing (5) which is then fastened to the mounting holes (48) with non-removable mechanical fasteners for security. There are two holes located on the front left side to allow the inner cord clamp (20) to be mounted with mechanical fasteners. At the front end there are cap holes (50) on the left and right sides to allow the end cap (14) to be mounted with mechanical fasteners. There is also a latch slot (41) to allow the latch (8) to pass through as well as a lock hole (42) to allow the keyed lock (11) to pass through. There are four latch plate mounting holes to allow the latch plate (9) to be mounted with tamper resistant or non-removable mechanical fasteners for security. There are gib screw holes (46) in the left side in which the wide gib (16) is mounted with mechanical fasteners. There is a latch hole (45) that passes through the left and right side in which the latch (8) is mounted to with a non-removable mechanical fastener for security. There is a switch hole (89) that passes through the left and right sides allowing the stock cup (3) to be mounted in a left or right hand orientation with the use of a removable mechanical fastener. There is also a return pulley mounting hole (43) that the return pulley (12) mounts to with tamper resistant or non-removable mechanical fasteners for security. The main tube (1) is covered with a powder coat or enamel finish to protect from the environment and or can be covered in a camouflaged pattern film, wrap or tape.

Figure 12:
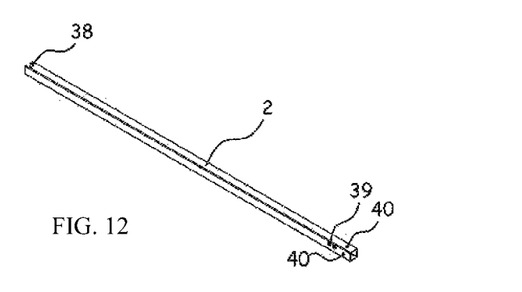
FIG. 12 shows an isometric view of the inner tube from the preferred embodiments.

FIG. 12 shows the inner tube (2) is made of a rigid hollow material such as steel, stainless steel, or aluminum extrusion. It has an extension stop (38) located at the inside end that consists of part of the tube being bent upwards and prevents the inner tube (2) from being removed from the main tube (1). There are two inner clamp holes (39) counter sunk into the outside end allowing the inner cord clamp (20) to be mounted using counter sunk screws which allows the muzzle cup (4) to fit over them. Near the outside end on each side of the tube are a total of four inner switch holes (40) that allow the muzzle cup (4) to be mounted in a left or right hand orientation with the use of removable mechanical fasteners. The inner tube (2) is covered with a powder coat or enamel finish to protect from the environment and or can be covered in a camouflaged pattern film, wrap or tape.

Figure 14:
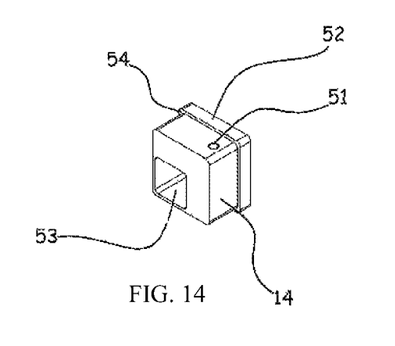
FIG. 14 shows an isometric view of the end cap from the preferred embodiments.

FIG. 14 shows the end cap (14) that is made of plastic or nylon that is possibly filled with lubricant to allow for smooth, quiet reduced friction movement of the inner tube (2) that passes through the tube hole (53) which is slightly larger than the inner tube (2) and acts as a bearing surface as well as keeps the inner tube (2) from rotating. The end cap (14) is inserted into the main tube (1) up to the cap stop (52) and secured with mechanical fasteners being passed through the cap holes (50) and into the end holes (51). The end cap (14) can be machined from a solid piece of material, extruded plastic or injection molded.

Figure 23:
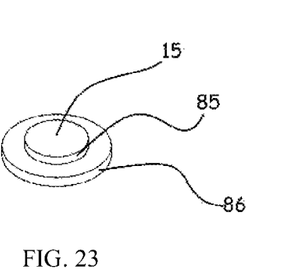
FIG. 23 shows an isometric view of the disk gib from the preferred embodiments.

FIG. 23 shows the disk gib (15). A quantity of two disk gibs (15) further supports the inner tube (2) by placing the positioning pegs (85) in the quantity of two gib holes (92) located on the bottom and right side of the main tube (1) with the running surface (86) being located on the inside of the main tube (1). Said running surface (86) that is larger than the positioning peg (85) prevents the disk gib from passing through the gib hole (92). The disk gib (15) is held in the gib hole (92) when the inner tube (2) is inserted into the main tube (1). Said disk gib can be made from injection molding or turned from a rod of plastic or nylon that is possibly filled with lubricant to allow for smooth, quiet reduced friction movement of the inner tube (2).

Figure 29:
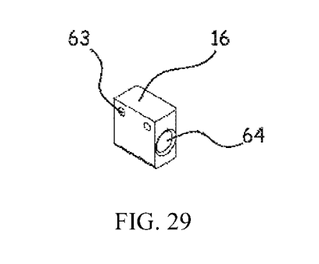
FIG. 29 shows an isometric view of the wide gib from the preferred embodiments.

FIG. 29 shows the wide gib (16) which fills the gap between the left side of the main tube (1) and the inner tube (2) and is held in place with non-removable mechanical fasteners passing through gib screw holes (46) of the main tube (1) and into the wide gib (16) mounting holes (63). There is a clearance hole (64) that has a radius on each end to prevent damage or abrasion to the return cord (13) which passes through it. The wide gib (16) can be machined from a solid piece of material or injection molded with said material being rigid plastic or nylon with or without added lubricants to allow for smooth, quiet reduced friction movement of the inner tube (2).

Figure 17:
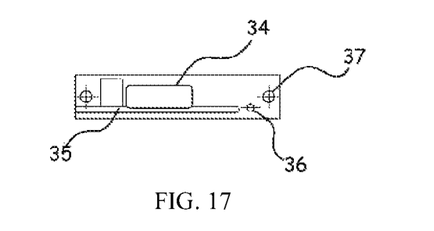
FIG. 17 shows a bottom view of the mechanism housing from the preferred embodiments.
Figure 18:
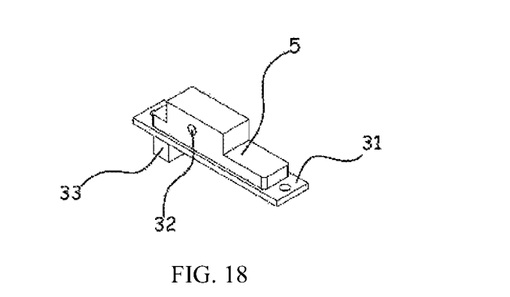
FIG. 18 shows an isometric view of the mechanism housing from the preferred embodiments.

FIGS. 17 and 18 show the mechanism housing (5) which fills the gap between the top side of the main tube (1) and the inner tube (2) with the extension gib (33) and is inserted through the mechanism hole (47) from the inside of the main tube (1) and rests on the contact shelf (31) with non-removable mechanical fasteners passing through the main tube (1) mounting holes (48) and into the mechanism plate mounting holes (37). The catch spur (6) is mounted in the spur pocket (34) by placing a non-removable fastener through the pivot hole (32), the catch spur (6), the spur pivot hole (71) and then through the other side of the pivot hole (32). The mechanism housing has a clearance slot (35) in which the mechanism shaft (7) passes through as well as a receiver hole (36) which the open ended extension spring (17) is attached to with a mechanical fastener. The mechanism housing (5) can be machined from a solid piece of material or injection molded with said material being rigid plastic or nylon with or without added lubricants to allow for smooth, quiet reduced friction movement of the inner tube (2).

Figure 27:
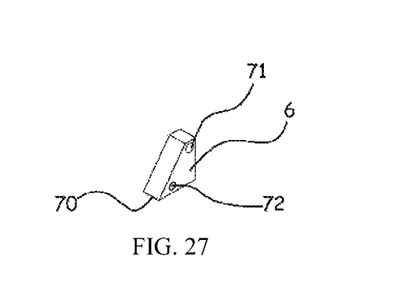
FIG. 27 shows an isometric view of the catch spur from the preferred embodiments.

FIG. 27 shows the catch spur (6) which prevents the inner tube (2) from extending when the pinch surface (70) is in contact with it. The catch spur (6) rotates on the spur pivot hole (71) and is mounted to and moved by the mechanism shaft (7) by a mechanical fastener being placed through the mechanism shaft (7) shaft hole (67) and then into the threaded hole (72). The catch spur (6) is made from hardened carbon steel with the pinch surface (70) being sharp to allow it to slightly dig into the inner tube (2)

Figure 28:
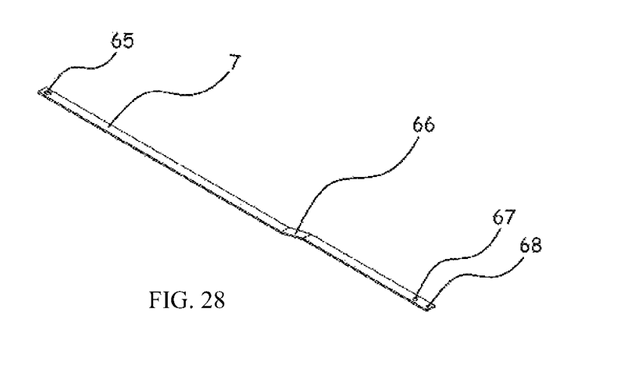
FIG. 28 shows an isometric view of the mechanism shaft from the preferred embodiments.

FIG. 28 shows the mechanism shaft (7) which connects the catch spur (6) to the latch (8) to allow for operation of the catch spur (6). At the end of the mechanism shaft (7) is a spring mounting hole (68) which allows an open ended extension spring (17) to be attached and add constant retracting force to the mechanism shaft (7) and subsequently the catch spur (6). At the other end, the mechanism shaft has a latch hole (65) to allow connection to the latch (8). Said latch hole (65) is oblong allowing the latch (8) to be in the locked position while the catch spur (6) can still move slightly forward allowing it to dig into the inner tube (2) if it is pulled on with excessive force as well as accommodate variation in the inner tube (2) height. The mechanism shaft (7) has an offset (66) to allow for alignment with the latch (8) and catch spur (6). The mechanism shaft (7) is made from a steel strip with punched or drilled holes.

Figure 15:
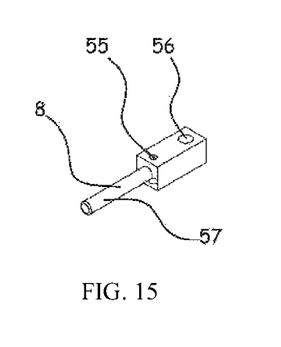
FIG. 15 shows an isometric view of the latch from the preferred embodiments.

FIG. 15 shows the latch (8) which operates the catch spur (6) and rocks forward and back on a non-removable or security fastener that passes through the main tube (1) latch hole (45) and through the latch pivot (56). The operating peg (57) is the point of contact for the operator and passes through the main tube (1) latch slot (41) as well as the latch plate's (9) latch guide (30). The mechanism shaft is mounted to the threaded hole (55) with a threaded mechanical fastener. The latch (8) is made of steel or stainless steel and has a powder coated or enamel finish. If made of stainless steel, it is left bare.

Figure 9:
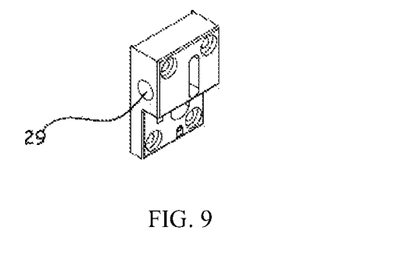
FIG. 9 shows a top view of the latch plate from the preferred embodiments.
Figure 10:
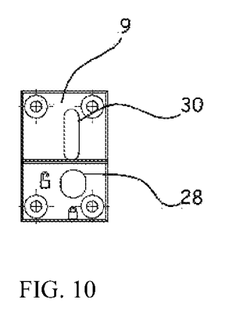
FIG. 10 shows an isometric view of the latch plate from the preferred embodiments.

FIGS. 9 and 10 show the latch plate (9) which has the keyed lock (11) mounted to it in the lock hole (28) which has two parallel edges that protrude into the hole to prevent the lock from turning. The latch guide (30) is slightly wider than the operating peg (57) and creates left to right support for the operating peg (57). The operating peg (57) has its forward and backward travel limited by the latch guide (30). A ball detent screw (10) is threaded into the detent hole (29) and creates a spring loaded catch that holds the latch (8) in the open position overcoming the tension created by the open ended extension spring (17). The latch plate (9) can be machined from a solid piece of material or injection molded with said material being rigid plastic or nylon.

Figure 16:
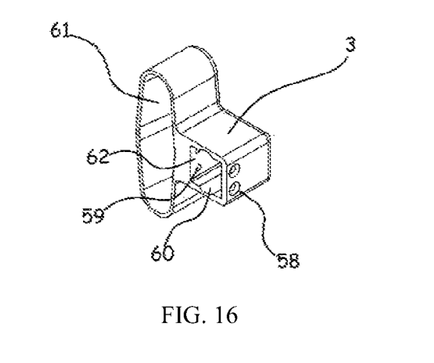
FIG. 16 shows an isometric view of the stock cup from the preferred embodiments.

FIG. 16 shows the stock cup (3) which mounts to the main tube (1) and receives the butt stock of the shoulder fired weapon. It has a tapered pocket (61) that is an oblong oval to allow multiple sized butt stocks to fit, not allowing them to rotate. The mounting pocket (62) is slightly larger than the main tube (1) to allow it to be easily slid over the end the main tube (1). The stock cup (3) can be mounted in a left or right hand orientation on the main tube (1) and is secured in place with a removable flat head cap screw that is fed through the counter sunk hole (58) and then the main tube (1) switch hole (89) and threaded into the receiving threaded hole (59). There are clearance gaps (60) at the top and bottom of the mounting pocket (62) to allow clearance for the mechanical fastener on which the return pulley (12) is mounted. The stock cup (3) can be machined from a solid piece of material or injection molded with said material being a smooth rigid plastic or nylon that will not scratch the finish of the weapons butt stock.

Figure 25:
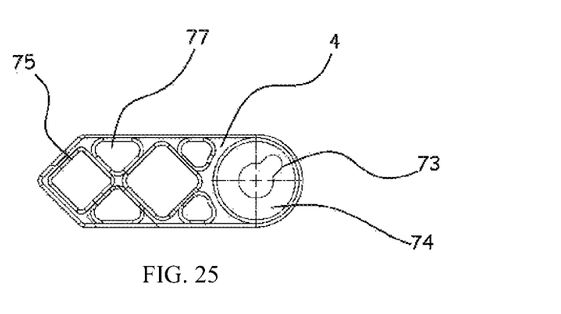
FIG. 25 shows an isometric view of the muzzle cup from the preferred embodiments.
Figure 26:
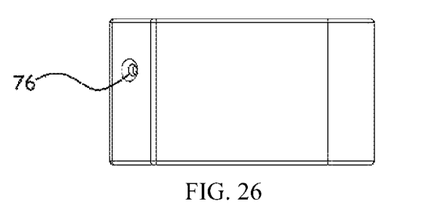
FIG. 26 shows a top view of the muzzle cup from the preferred embodiments.

FIGS. 25 and 26 show the muzzle cup (4) which mounts to the inner tube (2) and receives the muzzle of the shoulder fired weapon. It has a tapered pocket (74) that accommodates multiple diameters of barrels and muzzles and has a peep cutout (73) to allow clearance for a shoulder fired weapon's front sight. The mounting pocket (75) is slightly larger than the inner tube (2) to allow it to be easily slid over the inner tube (2). The muzzle cup (4) can be mounted in a left or right hand orientation on the inner tube (2) and is secured in place with a removable flat head cap screw that is fed through the counter sunk hole (76) and then the inner tube (2) switch holes (40) and a nut applied to the end of the screw. The muzzle cup (4) can be machined from a solid piece of material or injection molded with said material being a smooth rigid plastic or nylon that will not scratch the finish of the weapons muzzle.

Figure 30:
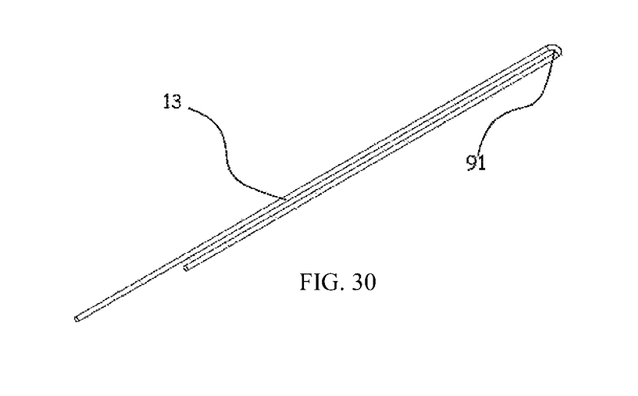
FIG. 30 shows an isometric view of the retracting cord from the preferred embodiments.

FIG. 30 shows the return cord (13) which is an elastic material that applies contracting tension to the main tube (1) and inner tube (2).

Figure 11:
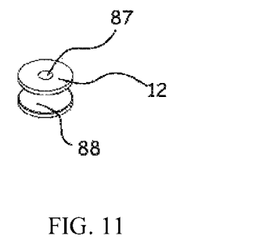
FIG. 11 shows an isometric view of the return pulley from the preferred embodiments.

FIG. 11 shows the return pulley (12) which reroutes the return cord approximately 180 degrees. It has a mounting hole (87) that a tamper resistant or non-removable mechanical fastener passes through as well as the main tube (1) return pulley mounting hole (43). The cord channel (88) is smooth and the edges have a radius to protect the return cord (13) from damage or abrasion. The return pulley (12) can be machined from a solid piece of material or injection molded with said material being rigid plastic or nylon.

Figure 20:
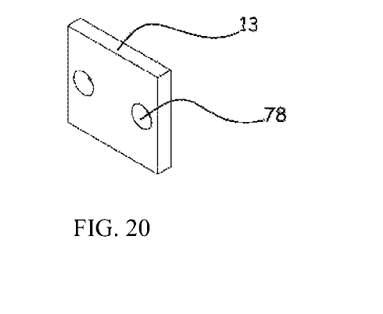
FIG. 20 shows an isometric view of the main cord clamp from the preferred embodiments.

FIG. 20 shows the main cord clamp (21) which has a quantity of two screw holes (78) and holds the return cord (13) in place by compressing it between the main cord clamp (21) and the main tube (1). It is machined from steel.

Figure 21:
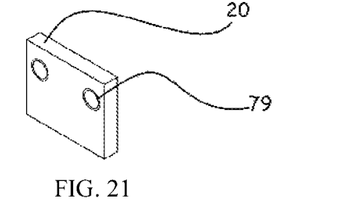
FIG. 21 shows an isometric view of the inner cord clamp from the preferred embodiments.

FIG. 21 shows the inner cord clamp (20) which has a quantity of two screw holes (79) and holds the return cord (13) in place by compressing it between the main cord clamp (21) and the inner tube (2). It is machined from steel.

Figure 22:
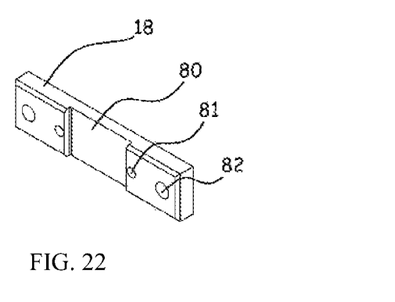
FIG. 22 shows an isometric view of the bottom clamp from the preferred embodiments.

FIG. 22 shows the bottom clamp (18) which has a tube channel (80) that the main tube (1) sits in and has a quantity of two screw holes (81) that are counter sunk from the back side (not shown) which allow for a flush surface when the mechanical fasteners are used to connect to the upper clamp (19). There are a quantity of two mounting holes (82) which are used to attach the captive weapon rack to another object with mechanical fasteners. The bottom clamp (18) is machined from steel, stainless steel, aluminum or extruded aluminum and has a powder coated or enamel finish.

Figure 24:
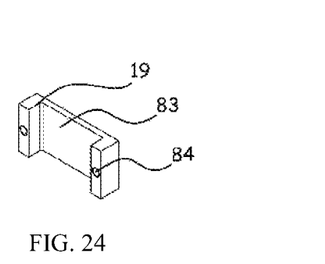
FIG. 24 shows an isometric view of the upper clamp from the preferred embodiments.

FIG. 24 shows the upper clamp (19) which encompasses the main tube opposite the bottom clamp (18). It is attached to the bottom clamp (18) with screws and is machined from steel, stainless steel, aluminum or extruded aluminum and has a powder coated or enamel finish.

DETAILED DESCRIPTION OF THE INVENTION (ALTERNATIVE FORM)

Figure 1:
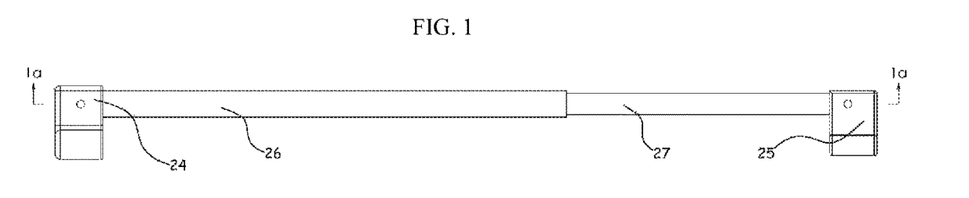
FIG. 1 shows the top view of the captive weapon rack in the basic embodiment comprising an extension spring.
Figure 1A:
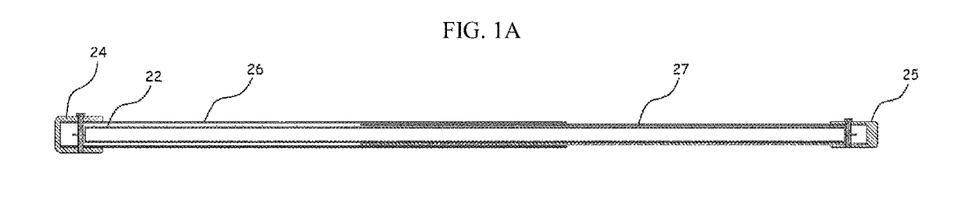
FIG. 1A shows a cross section front view of the captive weapon rack in the basic embodiment detailing the extension spring that contracts the end cups
Figure 2:
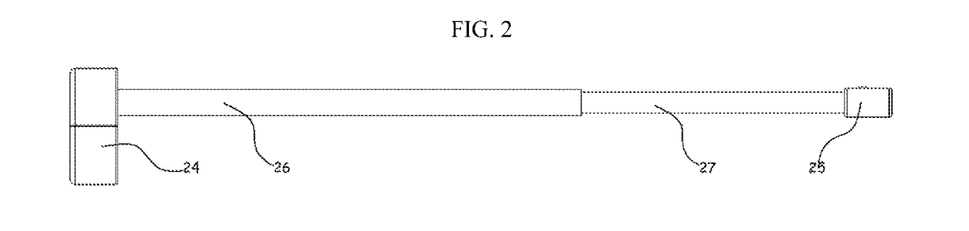
FIG. 2 shows the front view of the captive weapon rack in the basic embodiment comprising an extension spring.
Figure 3:
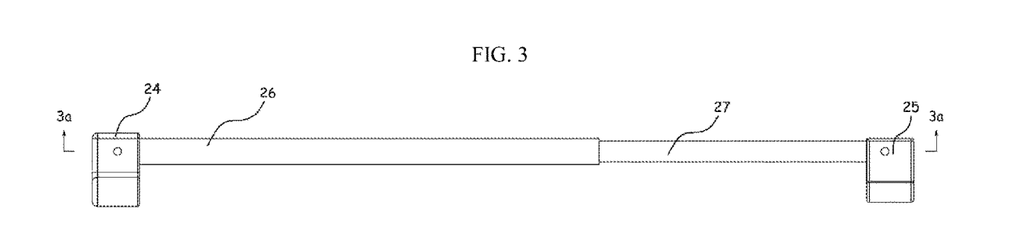
FIG. 3 shows the top view of the captive weapon rack in the basic embodiment comprising a retracting gas spring.
Figure 3A:
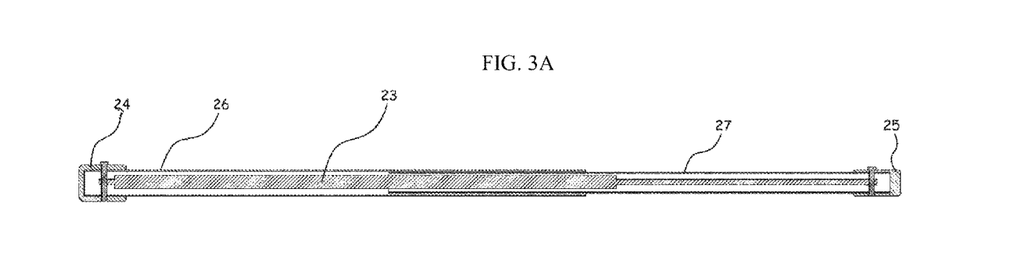
FIG. 3A shows a cross section front view of the captive weapon rack in the basic embodiment detailing the extension gas spring that contracts the end cups.
Figure 4:
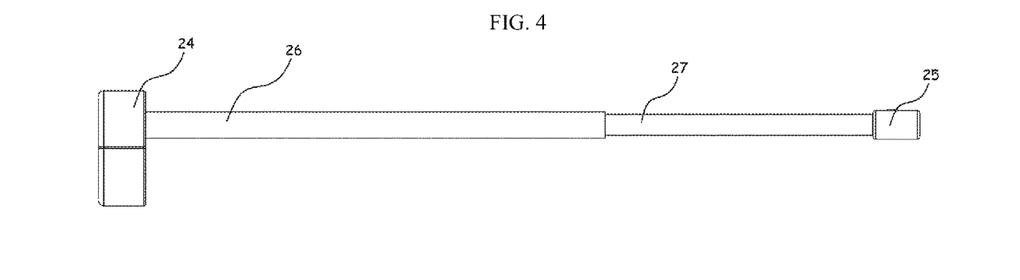
FIG. 4 shows the front view of the captive weapon rack in the basic embodiment comprising a gas extension spring.
Figure 5:
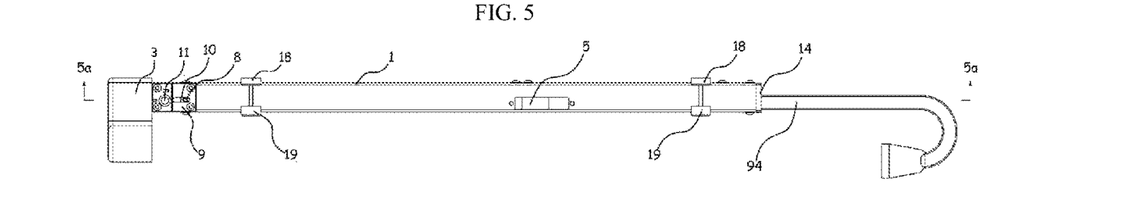
FIG. 5 shows a top view of the captive weapon rack further comprising a bent end tube which incorporates an enlarged end that captures the barrel of the weapon and a locking mechanism.

FIG. 5 shows a top view of the captive weapon rack in alternative form comprising a main tube (1), alternate inner tube (94) stock cup (3), muzzle cup (4), mechanism housing (5), latch (8), latch plate (9), ball detent (10), keyed lock (11), end cap (14), bottom clamp (18) and upper clamp (19).

Figure 5A:
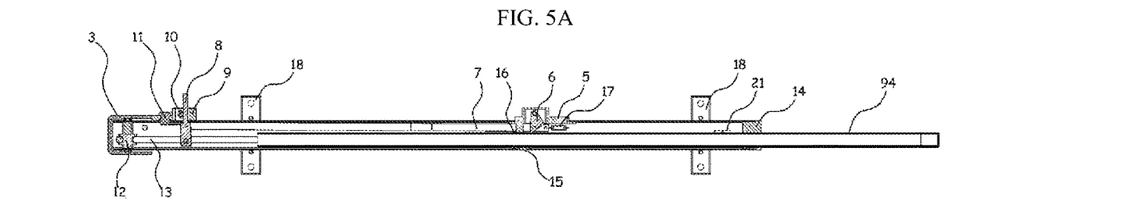
FIG. 5A shows a cross sectional front view of the captive weapon rack further comprising a bent end tube detailing the locking mechanism.

FIG. 5A shows a sectional view from the front of the captive weapon rack alternative form comprising a main tube (1), alternate inner tube (94), stock cup (3), muzzle cup (4), mechanism housing (5), catch spur (6), mechanism shaft (7), latch (8), latch plate (9), ball detent (10), keyed lock (11), return pulley (12), return cord (13), end cap (14), disk gib (15), wide gib (16), open ended extension spring (17), bottom clamp (18), upper clamp (19), inner cord clamp (20) and main cord clamp (21).

Figure 6:
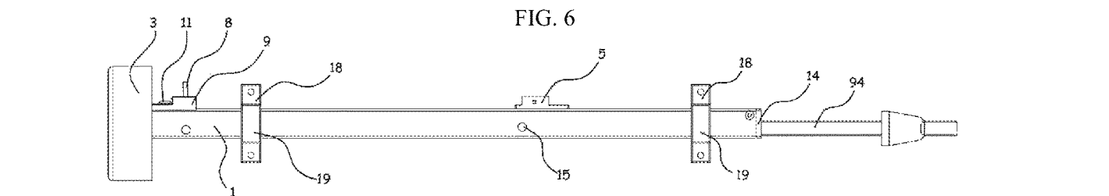
FIG. 6 shows a front view of the captive weapon rack further comprising a bent end tube which incorporates an enlarged end that captures the barrel of the weapon.

FIG. 6 shows a front view of the captive weapon rack alternative form comprising a main tube (1), alternate inner tube (94), stock cup (3), muzzle cup (4), mechanism housing (5), latch (8), latch plate (9), keyed lock (11), end cap (14), bottom clamp (18) and upper clamp (19).

Figure 19:
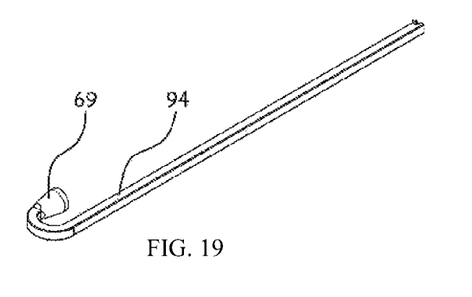
FIG. 19 shows an isometric view of the catch tube from an alternate embodiment.

FIG. 19 shows an alternate inner tube (94) which has a flared cone (69) at the end of the tube that is bent backwards. The alternate inner tube (94) is made of steel or stainless steel with the bend being mandrel bent and the flared cone (69) being flared from the tube or welded on with a plastic coating on the inside of the flared cone (69) to prevent scratching of the weapons muzzle.

Figure 31:
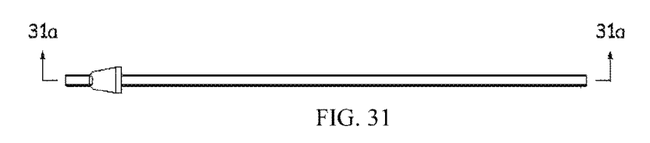
FIG. 31 shows a front view of the alternate inner tube from the alternate embodiments.
Figure 31A:
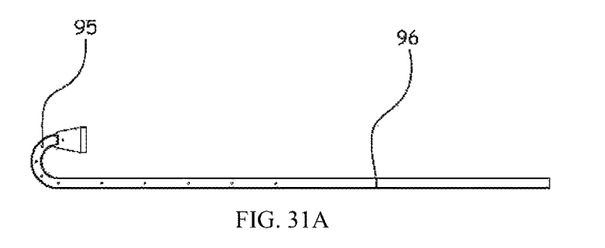
FIG. 31A shows a top sectional view of the alternate inner tube from the alternate embodiments.

FIG. 31 shows another embodiment of the alternate inner tube (94) further comprising exhaust holes (95) which are drilled or punched through the alternate inner tube (94) and projectile stop (96) which is inserted through a punched or milled slot in alternate inner tube (94) and then welded into place.

Figure 32:
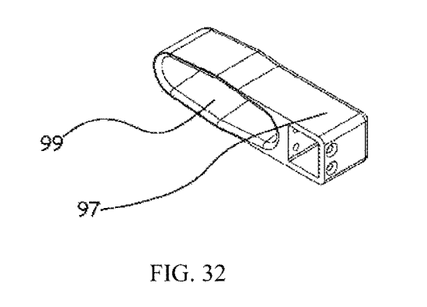
FIG. 32 shows an isometric view of the crossbow stock cup from the alternate embodiments.

FIG. 32 shows the crossbow stock cup (97) which comprises a horizontal cup (99) allowing the limbs of a crossbow to be perpendicular to the top of the captive weapon rack.

Figure 33:
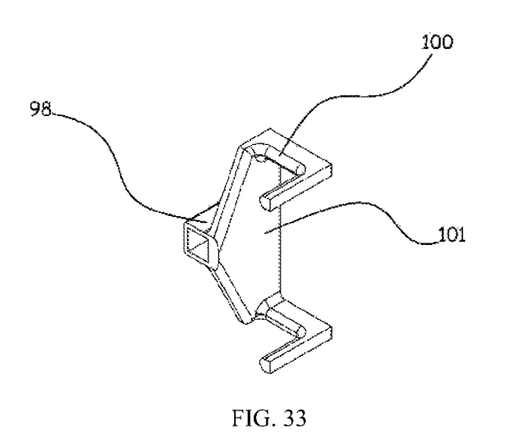
FIG. 33 shows an isometric view of the crossbow muzzle cup from the alternate embodiments.

FIG. 33 shows the crossbow limb cup (98) which comprises a limb pocket (100) comprising a cocking handle pocket (101) with a plurality of uprights that capture the limbs of a crossbow.

Function (Preferred Embodiment)

The captive weapon rack is designed to be mounted to another object with the keyed lock (11) facing upward and the main tube (1) in a horizontal orientation. An alternative mounting position would be for the captive weapon rack to be mounted in a vertical or near vertical position with the muzzle cup (4) being above the stock cup (3). The top side of the weapon is meant to be on the same side of the captive weapon rack as the keyed lock (11). The captive weapon rack is intended to be in the relaxed/compressed state when not in use. The end of the inner tube (2) that is hidden inside of the main tube (1) is supported and captured by the quantity of two disk gibs (15), wide gib (16) and mechanism housing (5) leaving a slight gap for free movement of the inner tube (2). Where the inner tube (2) exits/enters the main tube (1), the end cap (14) guides and supports the inner tube (2) preventing it from rotating and allowing it to move freely since the inner tube (2) is slightly smaller than the tube hole (53). Because of this, the inner tube (2) does not come in contact with the main tube (1). The user will unlock the keyed lock (11) and pull back on the latch (8) with his/her thumb until the latch passes the ball detent (10). This will allow the latch (8) to remain in the open position, overcoming the return tension being applied to it by the open ended extension spring (17). This activity causes the mechanism shaft (7) to pull the catch spur (6) open and away from the inner tube (2) allowing the inner tube (2) to be extended. The user will place the muzzle of a shoulder fired weapon into the muzzle cup (4) with the weapon being at a slight angle to the main tube (1) to assure that the weapon doesn't make contact with the stock cup (3). Said muzzle cup (4) is tapered to allow the weapon's muzzle to be inserted at an angle. The user will then push the weapon forward, linear to the main tube (1) until the butt stock of the weapon is past the stock cup (3). The return cord (13) is applying pressure against the muzzle of the weapon during this activity. The return cord (13) will stretch as the inner tube (2) is extended. As the return cord stretches, it is also rolling around the return pulley (12). This allows a long length of return cord (13) to be used in a near constant tension manner for a smooth extension of the inner tube (2). The user will then place the weapon's butt stock in front of the stock cup (3) and allow the weapon's butt stock to settle into the stock cup (3). The user will then press the latch into the closed position towards the muzzle cup (3) causing the open ended extension spring (17) to pull the catch spur (6) into the inner tube (2). The catch spur (6) will dig slightly into the inner tube (2) not allowing the inner tube (2) to be extended and thus keeping the weapon securely in place. The user can then place the key into the keyed lock (11) and turn it to the locked position causing the latch (8) to remain in the closed position. To remove the weapon, the user will unlock the keyed lock (11), pull the latch (8) towards the stock cup (3) past the ball detent (10) to the open position, move the weapon towards the muzzle cup (4) until the butt stock of the weapon clears the stock cup (3), pull the butt stock of the weapon away from the captive weapon rack a few inches, and then move the weapon away from the muzzle cup (4) linear to the main tube (1) until the muzzle cup (4) is resting on the end cap (14). This is the relaxed position.

Function (Alternate Embodiments)

The alternate inner tube (94) replaces inner tube (2) as stated in the preferred embodiment. The alternate inner tube (94) comprises a hollow tube that is bent to allow the flared cone (69) to be adjacent to the alternate inner tube (94). In the event the weapon being held in the captive weapon rack discharges, gasses from the combustion are able to exit through a series of exhaust holes (95), and the projectile enters the alternate inner tube (94). Said projectile's energy is absorbed by passing through ballistic gelatin that has been cast into the alternate inner tube (94). The displaced ballistic gelatin is able to exit the alternate inner tube (94) through the exhaust holes (95) that continue down the length of the alternate inner tube (94). The projectile stop (96) prevents the ballistic gelatin from being pushed from the back end of the alternate inner tube (94) creating a final stop for said projectile.

Assembly (Preferred Embodiment)

A shoulder screw with anaerobic adhesive applied to the threads is passed through the mechanism shaft (7) latch hole (65) and into the latch's (8) threaded hole (55). A shoulder screw with anaerobic adhesive added to the threads is then passed through the mechanism shaft's (7) shaft hole (67) and threaded into the catch spur's (6) threaded hole (72). The catch spur (6) is then placed in the mechanism housing (5) spur pocket (34) and a pin is passed through the pivot hole (32) and spur pivot hole (71). The retracting cord (13) is then passed through the wide gib (16) clearance hole (64) and fed through the main tube (1). The wide gib (16) is then screwed to the main tube (1) and a quantity of two disk gibs (15) are placed in the main tube gib holes (92). The assembly consisting of the catch spur (6), mechanism shaft (7), latch (8) and mechanism housing (5) is slid through the main tube (1), and the mechanism housing (5) is fed up through the mechanism hole (47) and attached to the main tube (1) with blind rivets. The latch (8) is attached to the main tube (1) with a captive nut and screw passed through the latch pivot (56) and latch hole (45). The end of the return cord that terminates nearest the end cap (14) is squeezed against the main tube (1) with the cord clamp (13) with screws that pass through the gib screw holes (46) and are threaded into mounting holes (63). The end of the return cord (13) that exits the back end of the main tube (1) is turned 180 degrees and fed through the inner tube (2) from back to front. The inner tube (2) is then fed through the main tube (1). The return pulley (12) is then fastened to the main tube (1) with a captive screw being passed through mounting hole (87) and return pulley mounting hole (43). The end cap (14) is then inserted into the main tube (1) and fastened with mechanical fasteners through end holes (51) and cap holes (50). The other end of the return cord (13) is squeezed against the inner tube (1) with the inner cord clamp (20) using screws through screw holes (79) and inner clamp holes (39). The keyed lock (11) is them mounted into the latch plate (9) lock hole (28), and the latch plate (9) is attached to the main tube (1) with blind rivets. The muzzle cup (4) is then fastened to the inner tube (1) with a screw and nut, and the stock cup (3) is mounted to the main tube (1) with a screw. The upper clamp (19) is attached to the lower clamp (18) around the main tube (1).

The invention claimed is:

1. A shoulder fired weapon rack proposed be mounted to a vehicle that encompasses a shoulder fired weapon's muzzle and butt stock for transport comprising a plurality of end cups that encompass the butt stock and muzzle of said shoulder fired weapon with said end cups mounted to a mechanical structure comprising a plurality of extending beams, a contracting mechanism that applies continuous tension between said end cups, the contracting mechanism comprising an elastic cord that keeps linear tension applied to the stock cup and muzzle cup, and a pulley with the elastic cord being redirected around it to allow for a near constant linear tension applied to the stock cup and muzzle cup.

2. A shoulder fired weapon rack in accordance with claim 1 with said mechanical structure comprising two telescoping tubes each having walls that are adjacent preventing the beams from rotating.

3. A shoulder fired weapon rack in accordance with claim 2 further comprising a tapered stock cup that allows for different width and height butt stocks to fit.

4. A shoulder fired weapon rack in accordance with claim 3 further comprising a tapered muzzle cup.

5. A shoulder fired weapon rack in accordance with claim 1 further comprising an extension spring that keeps linear tension applied to the stock cup and muzzle cup.

6. A shoulder fired weapon rack in accordance with claim 1 further comprising a gas filled extension spring that keeps linear tension applied to the stock cup and muzzle cup.

7. A shoulder fired weapon rack in accordance with claim 1 further comprising an extension prevention mechanism that allows the stock cup and muzzle cup to continue to retract even after the mechanism is locked to accommodate any settling of the weapon's butt stock or muzzle into the muzzle cup or stock cup.

8. A shoulder fired weapon rack in accordance with claim 7 further comprising a keyed lock that prevents the operating latch from being moved but still allows the muzzle cup to continue to retract accommodating any settling of the weapon's butt stock or muzzle into the muzzle cup or stock cup.

9. A shoulder fired weapon rack in accordance with claim 8 further comprising a latch override that allows the muzzle cup to be extended during the insertion of a weapon allowing the captive weapon rack to be used with only one hand.

10. A shoulder fired weapon rack in accordance with claim 9 further comprising inner tube guide gibs.

11. A shoulder fired weapon rack in accordance with claim 10 further comprising a multitude of adjustable mounts.

12. A shoulder fired weapon rack in accordance with claim 11 comprising a multitude of adjustable mounts and end cups that can be adjusted to allow said shoulder fired weapon rack to be mounted to an object allowing access from a multitude of angles.

13. A shoulder fired weapon rack in accordance with claim 1 further comprising a projectile stop which encompasses the muzzle of the weapon that is being held comprising a tube redirecting a discharged projectile down said tube through a semi solid material that dissipates the projectile's energy further comprising a plurality of holes to displace the gasses from the combustion of discharge and a permanently attached safety stop that encloses the end of the tube.

14. A shoulder fired weapon rack in accordance with claim 13 further comprising a ballistic gelatin that fills said tube to dissipate the projectile's energy.

* * * * *